United States Patent
Tender et al.

(10) Patent No.: US 7,550,224 B1
(45) Date of Patent: Jun. 23, 2009

(54) APPARATUS EQUIPPED WITH METALLIC MANGANESE ANODE FOR GENERATING POWER FROM VOLTAGE GRADIENTS AT THE SEDIMENT-WATER INTERFACE

(75) Inventors: Leonard Tender, Bethesda, MD (US); Daniel Lowy, Woodbridge, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 392 days.

(21) Appl. No.: 11/307,561

(22) Filed: Feb. 13, 2006

Related U.S. Application Data

(60) Provisional application No. 60/712,612, filed on Aug. 30, 2005.

(51) Int. Cl.
*H01M 2/12* (2006.01)
*H01M 8/16* (2006.01)
*H01M 4/36* (2006.01)
*H01M 6/34* (2006.01)

(52) U.S. Cl. .............................. 429/50; 429/2; 429/105; 429/119

(58) Field of Classification Search ..................... 429/2, 429/119, 105, 50
See application file for complete search history.

(56) References Cited

U.S. PATENT DOCUMENTS

| 2,976,342 | A | * | 3/1961 | Morehouse et al. ............ 429/13 |
| 3,685,983 | A | * | 8/1972 | Louzos ........................ 428/605 |
| 4,085,254 | A | | 4/1978 | Atkins |
| 4,278,743 | A | | 7/1981 | Thompson |
| 4,776,820 | A | | 10/1988 | Mapes |
| 5,158,838 | A | | 10/1992 | Bjordal et al. |
| 5,242,768 | A | | 9/1993 | Nagatsuka et al. |
| 5,288,564 | A | | 2/1994 | Klein et al. |
| 5,427,871 | A | | 6/1995 | Garshol et al. |
| 5,770,945 | A | | 6/1998 | Constable |

(Continued)

FOREIGN PATENT DOCUMENTS

GB    09191    4/1913

(Continued)

OTHER PUBLICATIONS

Bilal, "Thermo-Electrochemical Reduction of Sulfate to Sulfide Using a Graphite Cathode," J. Appl. Electrochem., 28, 1073, (1998).

(Continued)

*Primary Examiner*—Patrick Ryan
*Assistant Examiner*—Thomas H. Parsons
(74) *Attorney, Agent, or Firm*—John J. Karasek; Joseph T. Grunkemeyer

(57) ABSTRACT

An apparatus having a metallic manganese anode; a cathode capable of reducing at least one species found in marine water; and a rig coupled to the anode and the cathode capable of maintaining the anode below a marine sediment surface and maintaining the cathode above marine the sediment surface. A method of generating power by: positioning in marine sediment a metallic manganese anode; positioning in marine water a cathode capable of reducing at least one species found in marine water; and connecting electrical leads between the anode, the cathode, and an electrical load.

18 Claims, 4 Drawing Sheets

U.S. PATENT DOCUMENTS

| | | | |
|---|---|---|---|
| 5,922,903 | A | 7/1999 | Pujado |
| 6,333,301 | B1 | 12/2001 | Kamiya |
| 6,575,248 | B2 | 6/2003 | Zhang et al. |
| 6,913,854 | B1 | 7/2005 | Alberte et al. |
| 2002/0061436 | A1 | 5/2002 | Inagaki et al. |
| 2002/0169091 | A1 | 11/2002 | Clare et al. |

FOREIGN PATENT DOCUMENTS

| | | |
|---|---|---|
| WO | WO-01/39306 | 5/2001 |

OTHER PUBLICATIONS

Bond D.R. et al. "Electrode Reducing Microorgaisms that Harvest Energy from Marine Sediments" Science, vol. 295, 483-485 Jan. 18, 2002.

DeLong, E.F. et al. "Power From the Deep" Nature Biology, vol. 20, pp. 788-789, Aug. 2002.

Habermann, et al., "Biological Fuel Cells With Sulphide Storage Capacity," Applied Microbiology Biotechnology, 35, 128, (1991).

Reimers, C.E. et al. "Harvesting Energy from Marine Sediment-Water Interface" Environ. Sci. Technol. 2001, 35, 192-195, Nov. 16, 2000.

Tender, L.M. et al. "Harnessing Microbially Generated Power on the Seafloor" Nature Biology, vol. 20, pp. 821-825, Aug. 2002.

Zhang, et al., "Modelling of a Microbial Fuel Cell Process," Biotechnology Letters, vol. 17 No. 8, pp. 809-814 (Aug. 1995).

Rejections in U.S. Appl. No. 11/044,166.

\* cited by examiner

APPARATUS EQUIPPED WITH METALLIC MANGANESE ANODE FOR GENERATING POWER FROM VOLTAGE GRADIENTS AT THE SEDIMENT-WATER INTERFACE

CROSS REFERENCE TO RELATED APPLICATIONS

This application claims priority to U.S. Provisional Patent Application No. 60/712,612, filed on Aug. 30, 2005 and incorporated herein by reference.

FIELD OF THE INVENTION

The invention relates generally to fuel cells for use in marine sediment and seawater.

DESCRIPTION OF RELATED ART

Typically, marine/oceanographic sensors and instruments deployed in water are powered by batteries. The key limitation of battery-based power supplies is depletion (i.e., exhaustion of energy content), which limits the period of time over which a sensor or instrument can operate. Many marine/oceanographic sensors and instruments deployed in water operate for short periods of time that are easily sustained by batteries. Many others (present or envisioned) operate unattended for longer periods of time, and are fundamentally limited by battery depletion requiring costly and resource intensive retrieval and redeployment cycles. It is widely recognized that many of these sensors and instruments would provide greater benefit if they should operate persistently.

U.S. Pat. No. 6,913,854 to Alberte et al. (all referenced patent documents and publications are incorporated herein by reference) discloses a fuel cell, which consists of an electrode imbedded in marine sediment connected by an external electrical circuit to an electrode positioned in overlying water. This fuel cell can generate power that is indefinitely sustained by continuous flux of reactants to each electrode.

BRIEF SUMMARY OF THE INVENTION

The invention comprises an apparatus comprising: an anode comprising metallic manganese; a cathode capable of reducing at least one species found in marine water; and a rig coupled to the anode and the cathode capable of maintaining the anode below a marine sediment surface and maintaining the cathode above the marine sediment surface.

The invention further comprises a method of generating power comprising: positioning in marine sediment an anode comprising metallic manganese; positioning in marine water a cathode capable of reducing at least one species found in marine water; and connecting electrical leads between the anode, the cathode, and an electrical load.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
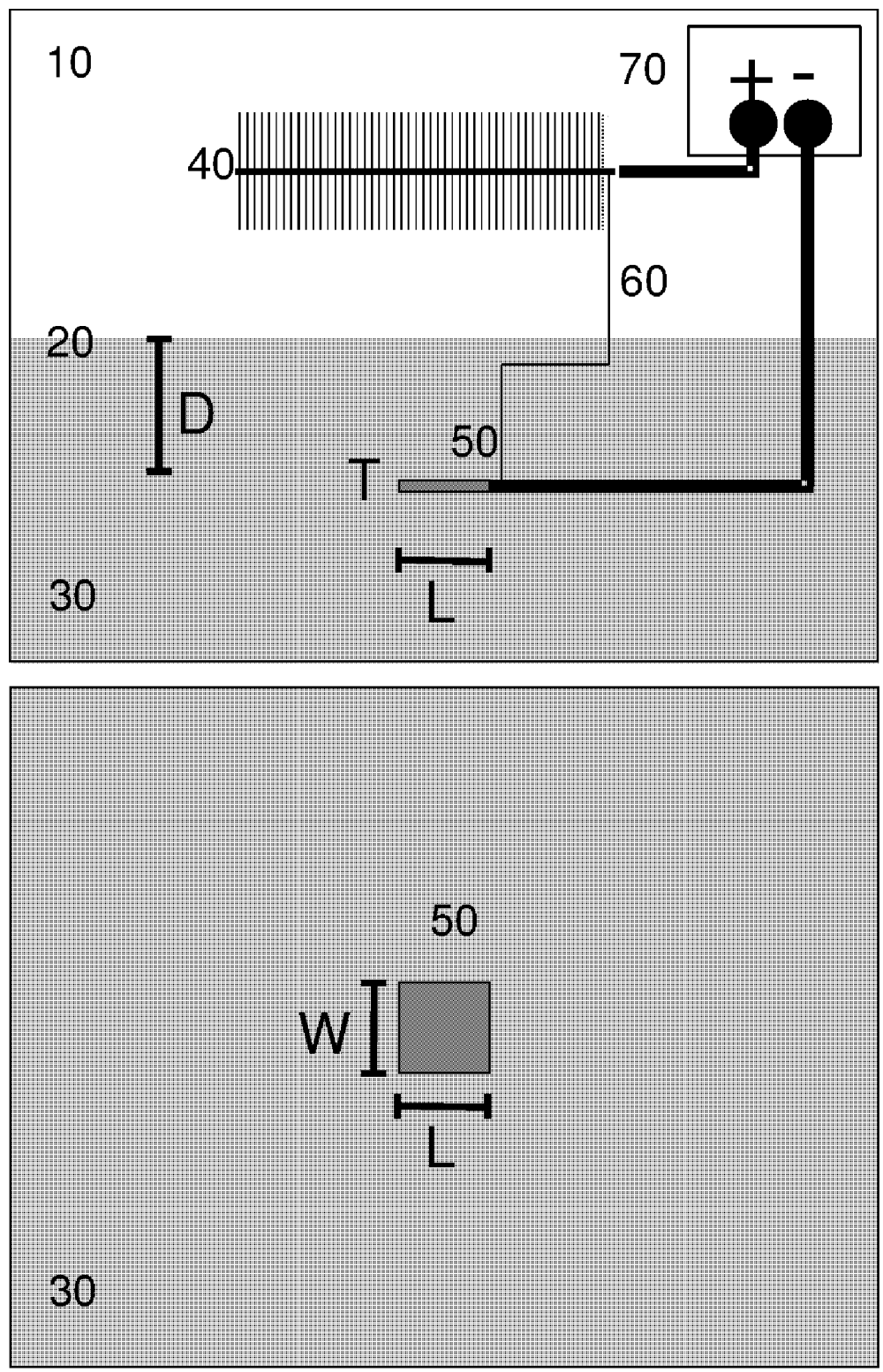
FIG. 1 schematically illustrates one embodiment of the device.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

In many fresh and salt-water marine environments substantial organic matter resides in sediment, which sustains microbial activity. Within the topmost millimeters to centimeters of such sediments, microorganisms preferentially deplete oxygen, causing microorganisms deeper in sediment to utilize less potent oxidants (such as sulfate) and generate as byproducts potent reductants (such as sulfide). The depth-dependency of microbe utilized oxidant gives rise to distinctive chemical gradients in sediment pore waters as each oxidant is successively exhausted ($O_2$, $MnO_2$, $HNO_3$, $Fe_2O_3$, $SO_4^{-2}$) and its reaction products ($H_2O$, $Mn^{2+}$, $Fe^{2+}$, $S^{-2}$) produced. As a consequence, a natural redox gradient exists across the sediment/water interface in which porewater within such marine sediment millimeters to centimeters beneath the sediment surface is enriched in reductants compared to overlying water. Because of this redox gradient, an electrode imbedded in such marine sediment will equilibrate to a voltage that is often more than 0.7 volts negative that of an identical electrode positioned in overlying water at open circuit (i.e., when the electrodes are not electrically connected). Connection of the electrodes by an external circuit of appropriate resistance results in sustainable electron flow (electrical current) from the sediment imbedded electrode (termed "anode" because of its negative potential) to the electrode in overlying water (termed "cathode" because of its positive potential). Current is sustained at the anode by continual oxidation of reductants in sediment porewater and at the cathode by continual reduction of oxidants in water. The acquired electrons flow from the anode through the external circuit where they can do work (such as power a marine deployed sensor or instrument) and continue with dimensioned voltage to the cathode where current is sustained by continual reduction of oxygen and/or other oxidants in overlying water.

In a shallow costal site near Tuckerton, N.J., USA, it was determined that in this environment at least two reductants were utilized that contributed simultaneously to power generation. The first reductant is sulfide. Sulfide is produced by microorganisms in sediment and is often found in high concentration in sediment porewater (4 mmol/L at the Tuckerton site). It was determined that power generation resulted in depletion of sulfide in porewater of sediment surrounding the anode, forming a sulfide depletion zone, which extends at least 10-cm into sediment. Furthermore, because sulfide is completely consumed in porewater of sediment in immediate contact with the anode surface, the rate of oxidation of sulfide by a graphite anode (i.e., electron transfer kinetics) was sufficient to oxidize each molecule of sulfide as it diffused into contact with the anode surface (i.e., fast electron transfer kinetics). For this reason, the contribution to power generation by oxidation of porewater sulfide at a graphite anode is considered to be limited by the rate at which sulfide diffuses to the anode surface from beyond the sulfide depletion zone (i.e., the process is mass transfer limited).

The second reductant identified was acetate. For a graphite anode, acetate does not readily give up electrons directly to the anode surface (i.e., pore electron-transfer kinetics). As previously demonstrated (Tender et al., "Harvesting Energy from the Marine Sediment-Water Interface," *Environmental Science and Technology* 35, 192-195 (2001) and Tender et al., "Harnessing Microbially Generated Power on the Seafloor," *Nature Biotechnology* 20, 821-825 (2002)), a microbial colony can spontaneously form on the surface of a graphite anode. This colony can be enriched in a class of microorganisms known to couple oxidation of acetate with reduction of insoluble iron and/or manganese based minerals. It is hypothesized that these microorganisms oxidize acetate in sediment porewater, and pass acquired electrons directly to the underlying anode surface, as if it were a large insoluble mineral, thereby contributing to overall power generation. In other words, microorganisms that spontaneously colonize a graphite anode catalyze (i.e., increase the kinetics of) the anode oxidation of acetate.

An expected value for power generated by a graphite anode was calculated based on diffusion-limited sulfide oxidation and found to be ~40% of the actual power generated. This calculation could therefore suggest that the balance of power (60%) could be attributed to microbial catalyzed acetate oxidation. This calculation, however, utilized a literature value for the diffusion coefficient of sulfide in marine sediment, rather than a measured diffusion coefficient of sulfide in the actual sediment in which the graphite anode was imbedded. Because diffusion coefficients can vary widely depending upon the medium, it is believed that this calculation was only approximate. Furthermore, based on the properties of manganese anodes in marine sediment it is believed that, in the case of a graphite anode, the power generated is predominately due to sulfide oxidation.

A suitable purpose of the invention is to persistently (i.e., indefinitely) generate sustained electrical power underwater by oxidation of marine sediment pore water with water from above the sediment/water interface. Possible applications of this power supply include, but are not limited to numerous marine sensors and instruments, which are presently powered by batteries, which are limited in duration by battery depletion, which would provide scientific and/or operational and/or cost savings benefit if their duration could be greatly extended, and which are deployed in water in environments that include but are not limited to the continental margins, fresh water lakes, rivers, estuaries, and harbors.

Such sensors and instruments currently provide valuable information about marine environments. Ongoing developments in low-power microelectronics, sensors, and data telemetry continually expand their scope and impact. The duration of such instruments, typically on the order of months, is primarily limited by their battery-based power supplies. As a consequence, their long-term uninterrupted (i.e., persistent) operation, widely recognized as a desired capability, is not possible. Furthermore, long-term operation is only possible when either the instrument is retrieved and redeployed with fresh batteries or additional instruments deployed sequentially. Both scenarios are cost and resource intensive, defeat covertness, and interrupt continuity of operation. The power supply disclosed here is intended to provide many years (persistent) power for marine autonomous deployed sensors and instruments.

One embodiment of the device (also known as a Manganese-Benthic Unattended Generator or Mn-BUG) is schematically illustrated in FIG. 1. The top panel corresponds to a side view, and the bottom panel corresponds to view from underneath looking up. The water 10 is above a sediment surface 20, and the sediment 30 is below the surface. A graphite bottlebrush cathode 40 is in the water 10, and a manganese anode 50 is in the sediment 30. The cathode 40 and anode 50 are attached to a rig 60 and to an external circuit 70. D is the depth of anode beneath sediment surface, L is the length of anode, W is the width of anode, and T is the thickness of anode.

The anode comprises metallic manganese, including but not limited to, at least about 90% manganese. When multiple constituent anodes are used, they may be electrically connected in parallel. Anode leads may be connected in parallel and terminate in an electrical circuit within the instrument or sensor, or the leads could be connected in parallel externally with a single lead passing into the interior of the sensor or instrument. The anode may have a planar configuration and may have a projected area of, but not limited to, about 1 $cm^2$ to about 1 $m^2$. The projected area of a planar anode is equivalent to the geometric area of one of its sides, not taking into account surface roughness or features, such as grooves, holes, etc. For example, when an anode consists of a plate of nominal thickness of T, length of L, and width of W, the projected area is determined by the product L×W. For such an anode, the projected area is equivalent to approximately ½ of its total geometric area (2LW+2TW+2TL) where TL and TW<<LW. In addition, the projected area of such an anode is equivalent to the footprint area it occupies when embedded parallel to the sediment surface.

The cathode is exposed to marine water that is from above the sediment surface. As with the anode, more than one cathode connected in parallel may be used. Suitable cathodes include, but are not limited to, graphite electrodes and graphite bottle brush electrodes. Graphite bottle brush electrodes can consist of, for example, approximately 2-inch long graphite yarn bristles spun from 7-micron diameter graphite fibers and twisted between pairs of stainless steel or titanium wires to facilitate robust electrical connection. Bottle brush electrodes can have very high surface area and have demonstrated long-term stability in numerous marine environments, being used as cathodes in galvanic seawater cells for many years (see U.S. Pat. No. 5,427,871). Each bottle brush anode can be connected at its stainless steel wire core to an electrical lead, which passes through sealed holes into the interior of the instrument or sensor. One attribute of graphite bottle brush cathodes is their very high surface area, resulting in very fast kinetics for oxygen reduction. This can allow for a much more compact cathode, based on volume (i.e., length×width×height) compared to a graphite plate cathode to provide the same amount of anode-limited power. For example, based on performance specifications of a series of galvanic seawater cells manufactured by Konsberg Maritime AS (Norway), utilizing graphite bottle brush anodes, fourteen 100-cm long graphite bottlebrush cathodes connected together can sustain 3 W. A 12-cm long graphite bottlebrush cathode could therefore, in principle, replace seven 0.34-$m^2$ graphite plate cathodes, without effecting power output.

The rig can be any structure to which the other components may be attached or coupled and maintained in the proper position. The term "coupled" includes direct attachment of a component to the rig, or indirect attachment by way of other named or unnamed components. Any position that exposes the anode to porewater and exposes the cathode to marine water is suitable.

The apparatus may be physically separated from the instrument or sensor it is powering. In this configuration, the rig can be a rigid, non-corrosive frame and can, for example, constitute a mooring for an instrument tethered to the sediment surface. Alternatively, the apparatus can be physically integrated to an instrument and sensor that sits on the sediment surface. In this configuration, the anode can be affixed to the sediment imbedded bottom of the instrument, while the cathode could be affixed to water exposed on the side or top. The rig may be contained in the instrument, or the instrument itself may be the rig.

Optionally, electrical leads can be attached to the anode and the cathode and to an electrical circuit. The circuit can be a device, instrument, or sensor to which it is desired to supply power from the apparatus. Example circuits may include, but are not limited to the following components: an electrical energy storage device or devices, such as batteries or capacitors; a charger which uses the power generated by the invention to charge the electrical energy storage device or devices; and sensors or instruments powered by the energy storage device. Example sensors and instruments include but are not limited to acoustic Doppler velocity profilers, acoustic sensors, seismometers, conductivity and temperature probes, surveillance instrumentation, and various chemical sensors and transponders. Such sensors and instruments currently provide valuable information about marine environments. Ongoing developments in low-power microelectronics, sensors, and data telemetry continually expand their scope and impact. Utilization of an energy storage device or devices and associated charger is to allow the invention to power sensors or instruments that require short bursts power greater than the sustained power of the invention.

The apparatus may be used by placing the anode below a marine sediment surface and the cathode above the surface, and letting the rig maintain the apparatus in this position. Any salt- or fresh-water environment in which sediment is enriched in reductants is a suitable location. Examples include, but are not limited to, environments in which sediment is enriched in reductants owing to oxidant-limited microbial activity within the sediment and environments in which sediment is enriched in reductants owing to an upward flux of reductants from deeper within or beneath the sediment.

In one embodiment the apparatus is configured to a sensor or instrument that sits on the sediment surface with its underside on or imbedded in sediment. There are numerous examples of such instruments which are battery-powered and which are limited in duration by battery depletion.

The magnitude of sustained power generated may be dependent upon the size, geometry, and configuration of its various components. The best configuration may be dependent upon the specific sensor or instrument it is to power, its power requirement, how it is configured to the sensor or instrument, and the specific environment it is operated in.

When the device is continually discharged at a regulated voltage or across a load of fixed resistance, it can generate a sustained level of power. This sustained level of power may be, on average, invariant with time. When the discharge voltage or load resistance is changed, the device may immediately generate a relatively higher level of power (so called "short term" power), which will decay over time, and converge to a sustained level of power.

When the device comprises of a pair of identical smooth electrodes, a change in projected area of the anode may result in a proportional change in sustained power over a range of anode size. A similar change in projected area of the cathode, however, may result in a minimum change in sustained power over a range of cathode size. This property is a reflection of the fact that the device is anode limited. That is, a cathode of smaller size than the anode may be used within limit without appreciably diminishing power output. There are at least three possible explanations for this property: 1) The kinetics of the cathode/oxidant electron transfer reactions (i.e., rate at which unit surface area of cathode can reduce excess oxidant arriving at the cathode surface) are faster than the kinetics of the anode/reductant electron transfer reactions (i.e., rate at which unit surface area of anode can oxidize excess reductant arriving at the anode surface); 2) The mass transfer (i.e., flux) of oxidant to the cathode surface (i.e., rate at which oxidant arrives at unit surface area of the cathode) is greater than the flux of reductant to the anode surface (i.e., rate at which reductant arrives at unit surface area of the anode); and 3) A combination of 1) and 2).

It has been determined that a 2-$cm^2$ geometric area manganese anode imbedded in marine sediment may generate at least 1000-times greater power density (i.e., >25 watt/$m^2$) compared to a graphite anode imbedded in the same sediment (0.020 watt/$m^2$). Based on scalability of the device this result leads to the expectation that a Mn-BUG utilizing an anode consisting of a 0.01-$m^2$ (~3-cm×3-cm) manganese plate and a 12-cm long graphite bottle brush cathode could be configured to sustain the same amount of power as the a 2.6-$m^2$ BUG. Furthermore, this result leads to the expectation that a Mn-BUG utilizing an anode consisting of a 0.1-m2 (~31-cm×31-cm) manganese plate and twelve 100-cm long graphite bottle brush cathodes could be configured to sustain 2.5 watts of continuous power. In order to sustain this amount of power, a graphite anode would have to have a projected area of at least 72 $m^2$ (8.5-m×8.5-m). Furthermore, this result leads to the expectation that a device utilizing an anode consisting of a 1-$m^2$ (~100-cm×100-cm) manganese plate and one hundred and twenty 100-cm long graphite bottle brush cathodes could be configured to sustain 25 watts of continuous power. In order to sustain this amount of power, a graphite anode would have to have a projected area of at least 729 $m^2$ (27-m×27-m).

Having described the invention, the following examples are given to illustrate specific applications of the invention. These specific examples are not intended to limit the scope of the invention described in this application.

Example 1

Figure 2:
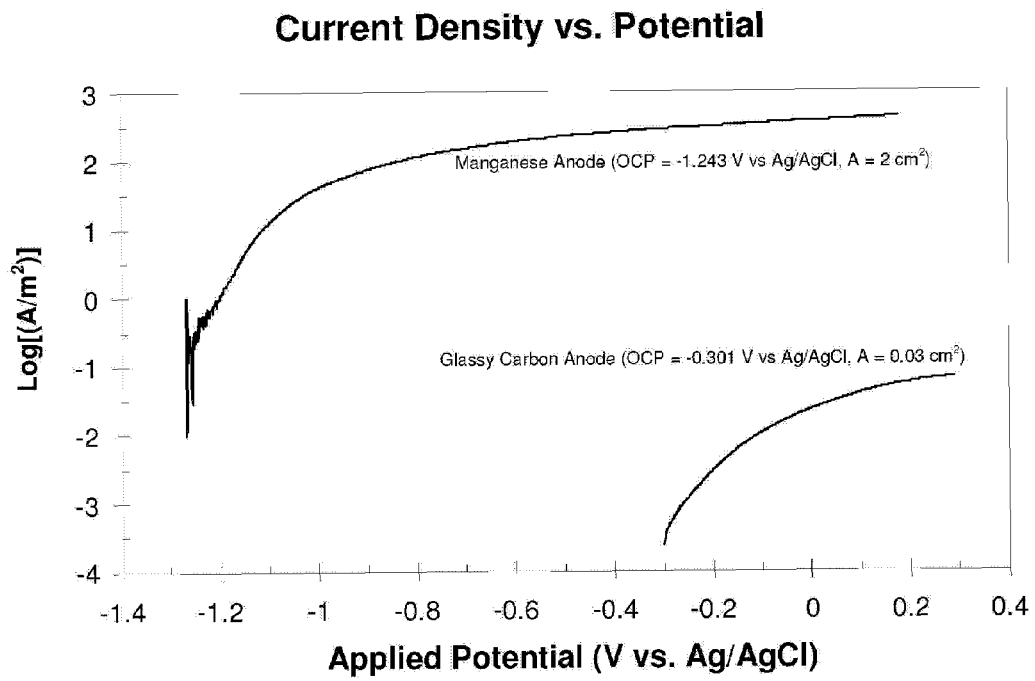
FIG. 2 depicts a comparison of current density vs. potential characterization of a manganese anode and a glassy carbon (graphite) anode.

Comparison of Mn to graphite (current density)—FIG. 2 depicts a comparison of current density vs. potential characterization of a manganese anode and a glassy carbon (graphite) anode. In the context of BUG anodes (i.e., non-Mn), this characterization reflects expected performance of BUGs in which each anode is matched with an ideal cathode (i.e., a graphite cathode of infinite size), so that sustained current, voltage, and power are only limited by the anode. The manganese anode consisted of an ~1-cm×1-cm square×0.1-cm (2-cm geometric area) of 99.999% manganese flake (Aldrich) with insulated connection to an electrical lead. The glassy carbon electrode consisted of 0.2-cm diameter (0.03-$cm^2$ geometric area) glassy carbon disc purchased and used as received from Bioanalytical Systems, Inc. (BAS). Measurements were conducted in a laboratory in a reconstructed seafloor comprised of sediment and seawater collected from a coastal site near Tuckerton, N.J. Each anode was inserted into sediment to the depth of 1 inch. Current density vs. potential properties for each anode was characterized using a potentiostat in a 3-electrode mode, in which the anode constituted the working electrode. An Ag/AgCl, sat. KCl reference electrode (BAS) and a larger glassy carbon counter electrode were positioned in the overlying seawater. The anodes were allowed to sit at open circuit (i.e., no current flow) overnight until their voltage equilibrated with sediment, and became invariant with time. In the case of the manganese anode, this voltage, referred to as its open circuit voltage, was −1.243 V vs. the Ag/AgCl, sat. KCl reference electrode. This is significantly more negative than the open circuit voltages of BUG graphite anodes. In the case of the glassy carbon electrode, the open circuit voltage was −0.301 V vs. the Ag/AgCl, sat. KCl reference. This is consistent with open circuit voltages of BUG graphite anodes. Once each anode had equilibrated to its open circuit voltage, its voltage was increased in the positive direction (positive potential) at a rate of 0.00100 volt per second by use of the potentiostat. For each anode, as its applied voltage began to increase, positive (i.e., oxidative) current began to flow resulting from oxidation of reductants in sediment porewater by the anode. For each anode, as voltage began to increase, the magnitude of current increased sharply and in the predictable form, reflecting relationship between voltage and current of kinetically limited electrochemical reaction. For each anode, as voltage continued to increase, current tended toward a limiting value in a predictable manner, reflecting onset of mass transferred limited current. For each anode, current density was determined by normalization of current by its geometric area. Because of the substantially more negative open circuit voltage of the manganese anode and the substantially greater mass transfer limited current of the manganese anode, it is hypothesized that the manganese anode utilizes a different reductant than the glassy carbon electrode. For example, the manganese anode may have orders of magnitude faster kinetics compared to graphite for electron-transfer from microbes colonizing its surface, which in turn are oxidizing porewater acetate.

Example 2

Figure 3:
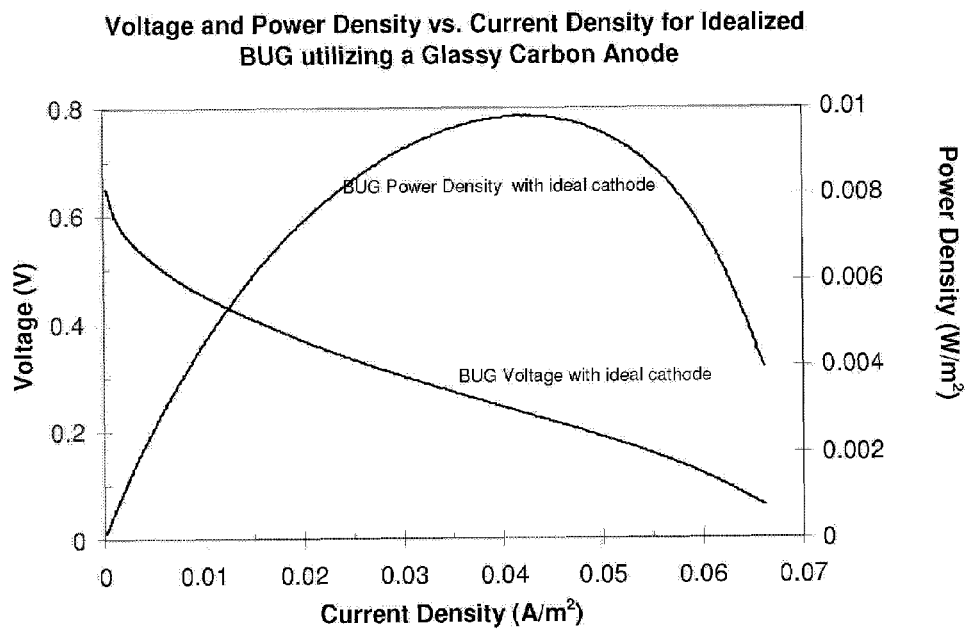
FIG. 3 shows voltage and power density vs. current density for an idealized BUG (Benthic Unattended Generator) utilizing a glassy carbon anode.
Figure 4:
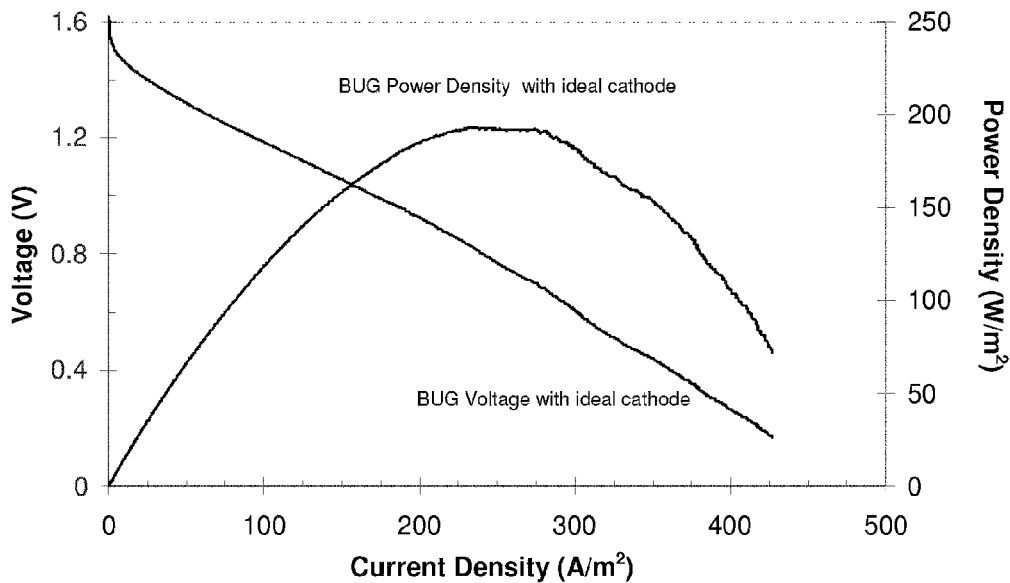
FIG. 4 shows voltage and power density vs. current density for an idealized BUG utilizing a manganese anode.

Comparison of Mn to graphite (voltage and power density)—FIGS. 3 and 4 depict characterizations of expected voltage and power density vs. current density for an idealized BUG utilizing a glassy carbon anode (FIG. 3) and a manganese anode (FIG. 4). These characterizations are based on the current density vs. potential characterization for each anode depicted in FIG. 3. In FIG. 4, the expected performance of a BUG is represented that consists of the manganese anode in FIG. 3 matched with an ideal cathode (i.e., a graphite cathode of infinite size so that sustained current, voltage, and power are only limited by the anode. Here, voltage of the BUG is determined by subtraction of the anode applied voltage from 0.35 V vs. Ag/AgCl, sat. KCl (i.e., the typical open circuit voltage of BUG graphite cathode). Power density is the product of voltage and current density. Here the voltage and power density vs. current density properties of the idealized BUG utilizing a glassy carbon anode are consistent with the properties of real BUGs utilizing graphite anodes (see FIG. 4 for example). Maximum power results from onset of limitation of mass transfer of reactants to anode surface. (Since only one face of glassy carbon anode exposed to sediment, 0.20 watt/$m^2$ footprint area is expected for BUG utilizing a gassy carbon plate anode with both sides exposed). This characterization indicates that a Mn-BUG (i.e., a BUG utilizing a manganese pale anode) is expected to sustain at least 23 to 190 watt/$m^2$. Extrapolation of data to ~½ of the open circuit voltage (0.8 V) suggests maximum mass transfer sustained power of 48 watt/$m^2$ by a Mn-BUG.

Example 3

Figure 5:
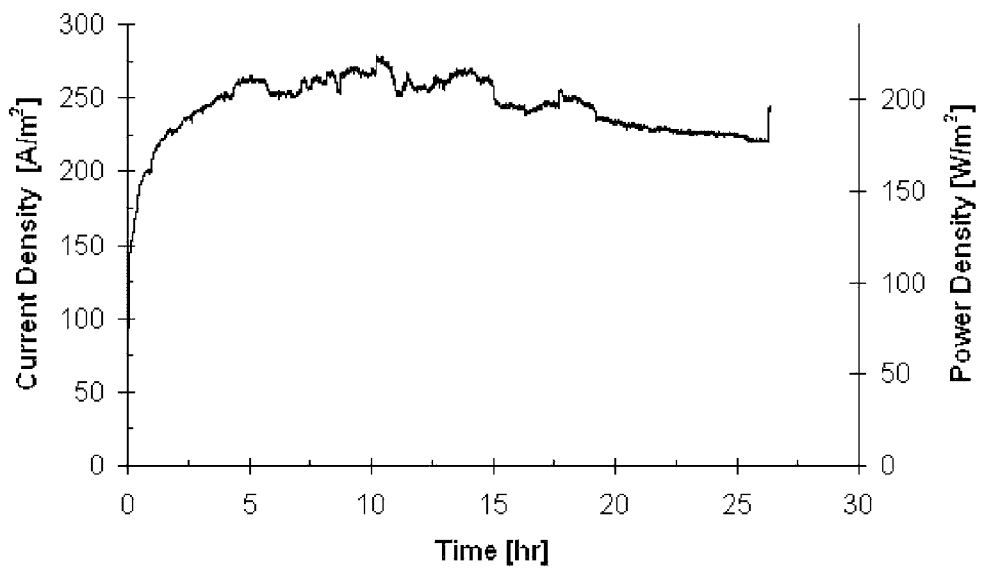
FIGS. 5 and 6 show current density and power density vs. time for a 1-cm$^2$ geometric area Mn anode discharged for >24 hours in marine sediment
Figure 6:
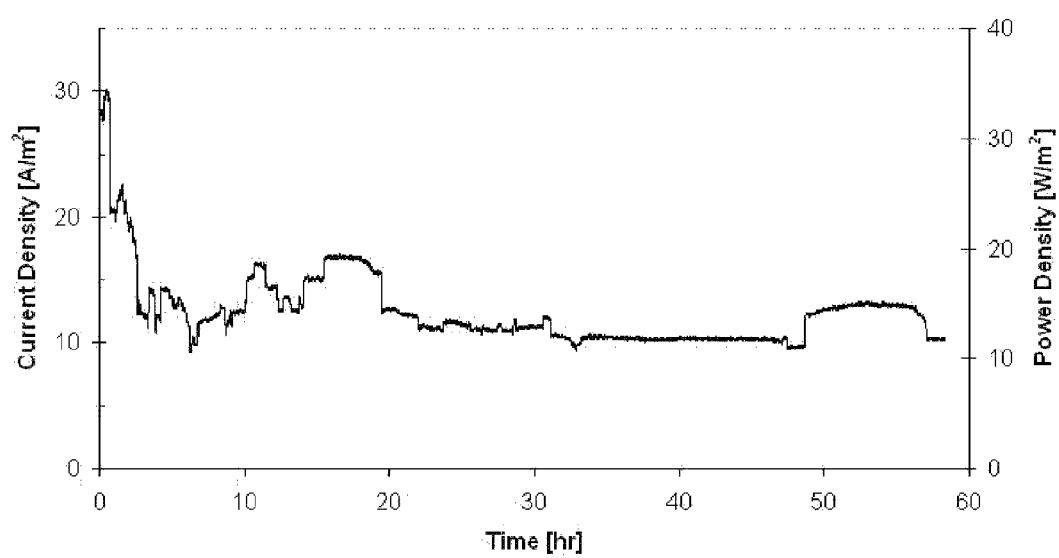

Prolonged discharge of Mn anode—FIGS. 5 and 6 depict data generated by prolonged discharge of a for a 1-$cm^2$ geometric area Mn anode discharged for >24 hours in marine sediment collected form Tuckerton, N.J. site, at constant voltage, corresponding to highest power density when matched with an ideal cathode (Voltage=−0.45 V vs. Ag/AgCl, sat. KCl, FIG. 5), and at lower current density (Voltage=−1.1 vs. Ag/AgCl, sat. KCl, FIG. 6). These figures demonstrate sustainable power density at different voltages (and therefore current densities) over the duration of measurements. Left axis indicates measured current normalized by anode geometric area yielding current density. Right axis indicates expected power density by a BUG utilizing a Mn anode with open circuit voltage (OCP) of −1.2 V vs. Ag/AgCl, sat. KCl reference electrode in overlying seawater and ideal cathode (large enough so that all BUG voltage drop occurs at anode). In FIG. 5, 0.8 V corresponds to BUG voltage expected for maximum power. OCP of cathode assumed to be 0.35 V vs. same Ag/AgCl reference electrode. In FIG. 6, 1.1 V is substantially greater BUG voltage than that expected at maximum power. OCP of cathode assumed to be 0.35 V vs. same Ag/AgCl, sat. KCl reference electrode.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed as new and desired to be protected by Letters Patent of the United States is:

1. An apparatus comprising:
   an anode comprising metallic manganese;
   a cathode capable of reducing at least one species found in marine water; and
   a rig coupled to the anode and the cathode capable of maintaining the anode below a marine sediment surface and maintaining the cathode above the marine sediment surface.

2. The apparatus of claim 1, further comprising:
   electrical leads capable of connecting the anode and the cathode to an electrical circuit.

3. The apparatus of claim 1, wherein the anode comprises at least about 90% metallic manganese.

4. The apparatus of claim 1, wherein the anode has a planar configuration.

5. The apparatus of claim 4, wherein the anode has a projected area of about 1 $cm^2$ to about 1 $m^2$.

6. The apparatus of claim 1, wherein the anode comprises a plurality of constituent anodes electrically connected in parallel.

7. The apparatus of claim 1, wherein the cathode comprises a plurality of constituent cathodes electrically connected in parallel.

8. The apparatus of claim 1, wherein the cathode comprises graphite.

9. The apparatus of claim 1, wherein the cathode is a graphite bottle brush electrode.

10. A method of generating power comprising:
    positioning in marine sediment an anode comprising metallic manganese;
    positioning in marine water a cathode capable of reducing at least one species found in marine water; and
    connecting electrical leads between the anode, the cathode, and an electrical load.

11. The method of claim 10, wherein positioning the anode and positioning the cathode is performed with a rig coupled to the anode and the cathode.

12. The method of claim 10, wherein the anode comprises at least about 90% metallic manganese.

13. The method of claim 10, wherein the anode has a planar configuration.

14. The method of claim 13, wherein the anode has a projected area of about 1 cm$^2$ to about 1 m$^2$.

15. The method of claim 10, wherein the anode comprises a plurality of constituent anodes electrically connected in parallel.

16. The method of claim 10, wherein the cathode comprises a plurality of constituent cathodes electrically connected in parallel.

17. The method of claim 10, wherein the cathode comprises graphite.

18. The method of claim 10, wherein the cathode is a graphite bottle brush electrode.

* * * * *